United States Patent [19]

Morisaki

[11] Patent Number: 5,033,183

[45] Date of Patent: Jul. 23, 1991

[54] CHUCK JAW CHANGER FOR A MACHINE TOOL

[75] Inventor: Eiichi Morisaki, Nagoya, Japan

[73] Assignee: Howa Machinery, Ltd., Nagoya, Japan

[21] Appl. No.: 354,353

[22] Filed: May 19, 1989

[30] Foreign Application Priority Data

May 20, 1988 [JP] Japan ................... 63-124368

[51] Int. Cl.$^5$ ......................................... B23Q 3/155
[52] U.S. Cl. ........................................ 29/568; 279/123
[58] Field of Search ............. 29/568; 279/123, 1 ME, 279/1 TS; 408/35

[56] References Cited

U.S. PATENT DOCUMENTS

| 4,100,671 | 7/1978 | Junike et al. | 29/568 |
| 4,313,252 | 2/1982 | Kuska et al. | 29/568 |
| 4,532,692 | 8/1985 | Chihiro | 29/568 |
| 4,587,708 | 5/1986 | Chihiro | 29/568 |

FOREIGN PATENT DOCUMENTS

| 192403 | 10/1984 | Japan | 29/568 |
| 201704 | 11/1984 | Japan | 29/568 |
| 249513 | 12/1985 | Japan | 29/568 |
| 71905  | 4/1986  | Japan | 29/568 |
| 63-15086 | 4/1988 | Japan | |

Primary Examiner—Larry I. Schwartz
Attorney, Agent, or Firm—Ladas & Parry

[57] ABSTRACT

A chuck jaw changer for a machine tool has a jaw changing arm which is swingable about a vertical rotating shaft. The two ends of the arm have elongated magazine holders extending transversely to the length of the arm. The magazine holder has a guide groove in which an elongated jaw magazine is fitted slidably along the length of the holder. The magazine is formed with a plurality of jaw storage grooves spaced apart from each other and chuck jaws are detachably accommodated in the storage grooves, respectively. When the jaw changing arm is indexed to position the magazine holder into registry with the jaw mounting groove of the chuck, one of the jaw storage grooves of the magazine is brought into alignment with the jaw mounting groove so that a jaw changing device operates to shift the jaw between the storage groove and the jaw mounting groove for changing the jaw. The other jaw storage grooves can be brought into alignment with the jaw mounting groove one by one by shifting the magazine along the magazine holder by means of a traversing device.

13 Claims, 11 Drawing Sheets 5,033,183

1

CHUCK JAW CHANGER FOR A MACHINE TOOL

BACKGROUND OF THE INVENTION

The present invention relates to a device for automatically changing a jaw of a chuck of a machine tool.

So far the changing of jaws of a machine tool chuck has been carried out manually, but it takes a long time to change the jaws, which is one of the important factors degrading productivity. Recently, in order to save labors, thereby improving productivity, the demand for the full automation of machine tools including their peripheral equipment has become increasingly high. To this end, various devices for automatically changing jaws of a chuck have been proposed. For instance, U.S. Pat. No. 4,532,692 issued Aug. 6, 1985 disclosed an automatic chuck jaw changer which is compact in size and light in weight. Thus chuck jaw changer has one magazine in the form of a turntable for storing therein jaws, and the number of sets of jaws to be stored is small. Furthermore, U.S. Pat. No. 4,587,708 issued May 13, 1986 discloses an automatic chuck jaw changer which is relatively large in size as compared to the above-mentioned automatic jaw changer and includes a jaw magazine in the form of a cylinder or drum so that the number of sets of jaws to be stored is increased. However, recently various machining operations are carried out so that the number of jaws to be stored and changed is increased and even the above-mentioned automatic jaw changer having the magazines with increased capacity cannot satisfy the demand for carrying out various machining operations. Furthermore, from the viewpoint of the installation space and other factors, it is almost impossible to increase the size of the magazine with a view to increasing the number of sets of jaws to be stored and changed.

SUMMARY OF THE INVENTION

In view of the above, the present invention has for its object to substantially solve the above and other problems encountered in the known automatic chuck jaw changer and provides an automatic jaw changer of which the main body is further compact in size and light in weight as compared with the chuck jaw changer disclosed in U.S. Pat. No. 4,532,692 but capable of changing tens of jaw sets.

The object of the present invention is attained by a chuck jaw changer for a machine tool having a chuck with at least one jaw mounting groove, comprising: an elongated chuck jaw magazine formed with a plurality of jaw storage grooves for detachably accommodating chuck jaws therein, respectively, said jaw storage grooves being arranged side by side along the length of the magazine so as to open laterally and spaced apart from each other by a predetermined distance; a jaw changing arm mounted on the machine tool in a manner swingable between a magazine mounting and dismounting position and a jaw changing position, said jaw changing arm supporting an elongated magazine holder having therealong a guide groove for slidably receiving said jaw magazine; indexing means for swinging said jaw changing arm to locate the jaw magazine held in the magazine holder at said magazine mounting and dismounting position or at said jaw changing position; traversing means for sliding said magazine held in said magazine holder along the length of the holder, while the jaw magazine is at said jaw changing position, to align the jaw storage grooves of the magazine one by one with each of the jaw mounting grooves of the chuck; and jaw changing means for shifting the jaws between each of the storage grooves of the magazine and each of the jaw mounting grooves of the chuck while each storage groove and each jaw mounting groove is aligned at said jaw changing position.

A preferred embodiment of the present invention will become understood from the following detailed description by referring to the accompanying drawings.

DESCRIPTION OF THE PREFERRED EMBODIMENT

Figure 1:
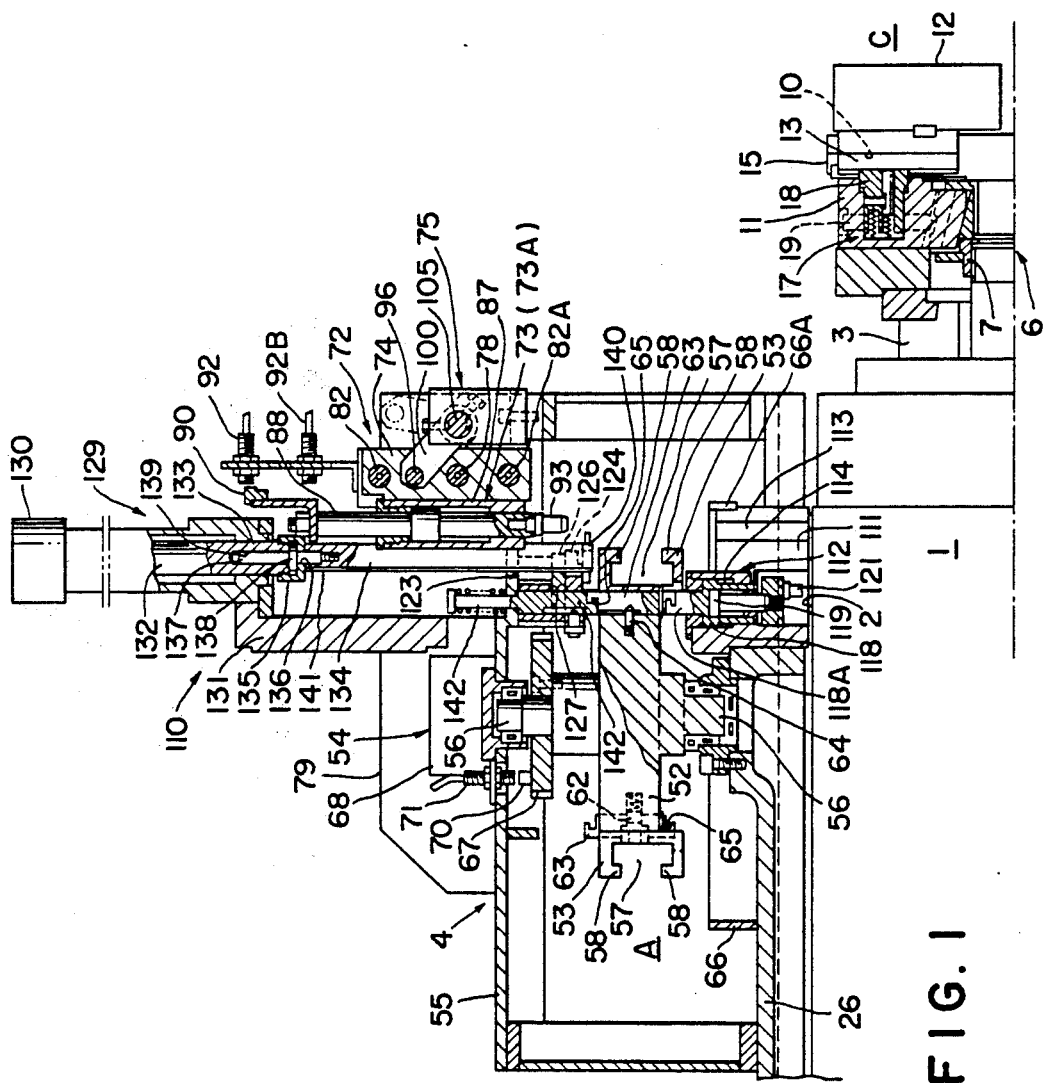
FIG. 1 is a view, in vertical section, of a preferred embodiment of the chuck jaw changer according to the present invention, which is in its inoperative state.
Figure 2:
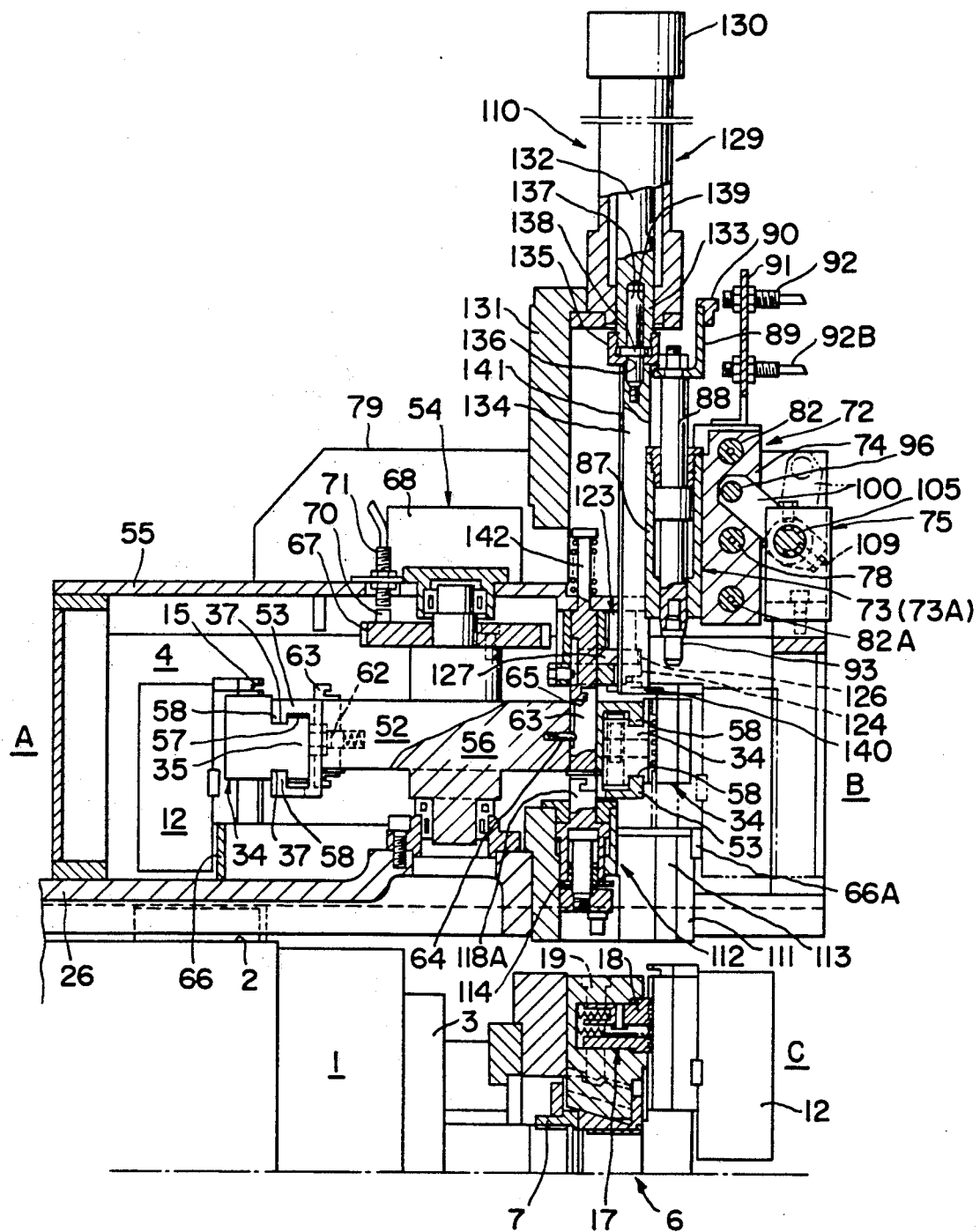
FIG. 2 is a sectional view similar to FIG. 1 but showing the changer in its operative state.
Figure 3:
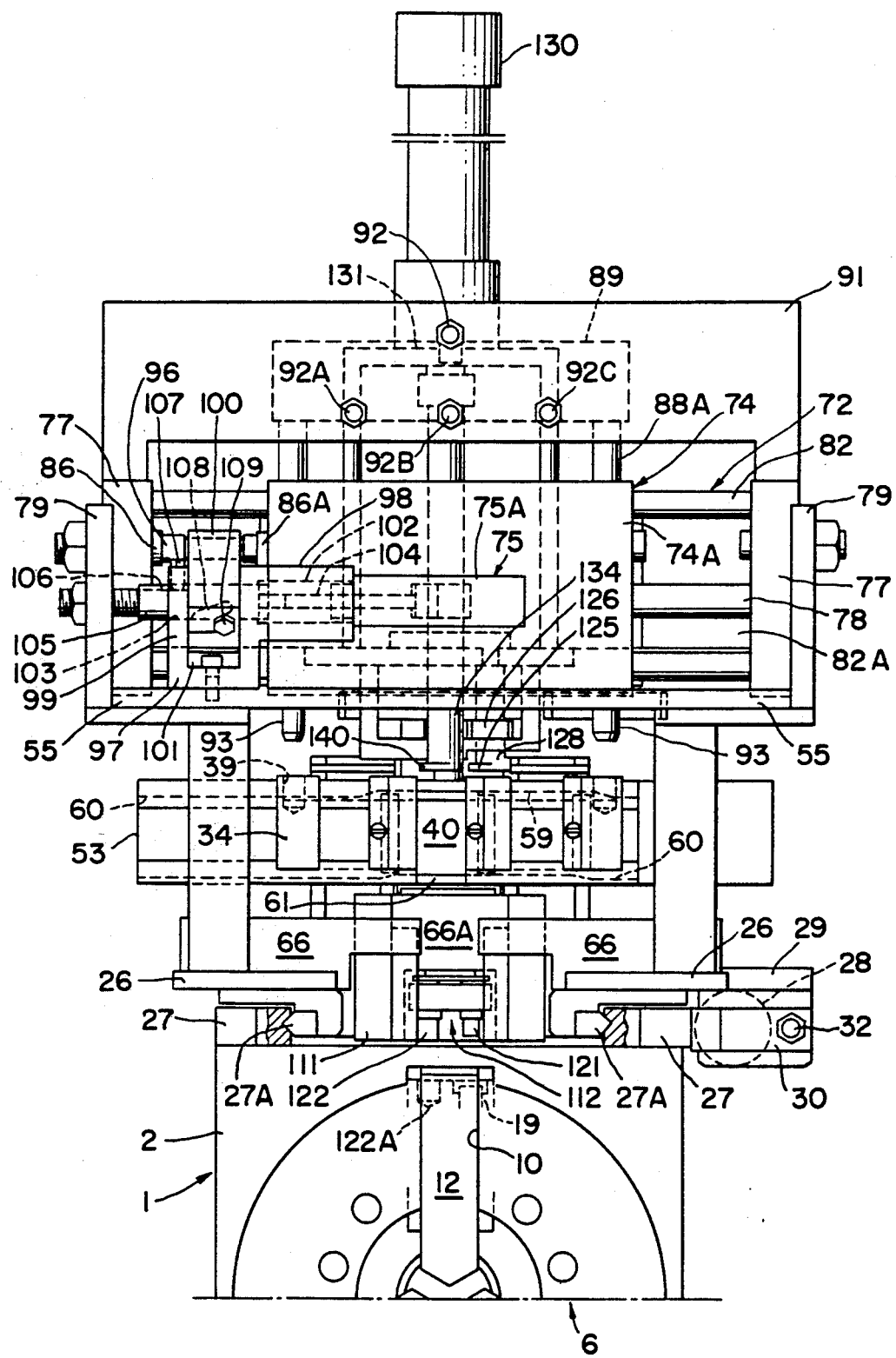
FIG. 3 is a front view of the chuck jaw changer.

Referring now to the accompanying drawings, a preferred embodiment of the present invention will be described. In FIGS. 1, 2 and 3, reference numeral 1 represents a main spindle head of a conventional machine tool such as a NC lathe; and 2, an upper surface of a machine base upon which is mounted an automatic chuck jaw changer to be described in detail hereinafter. Attached to the end of a main spindle 3 is a quick change chuck 6 of the type disclosed in Japanese Patent Publication (Kokoku) No. 63-15086 published April 2, 1988.

Figures 14, 15:
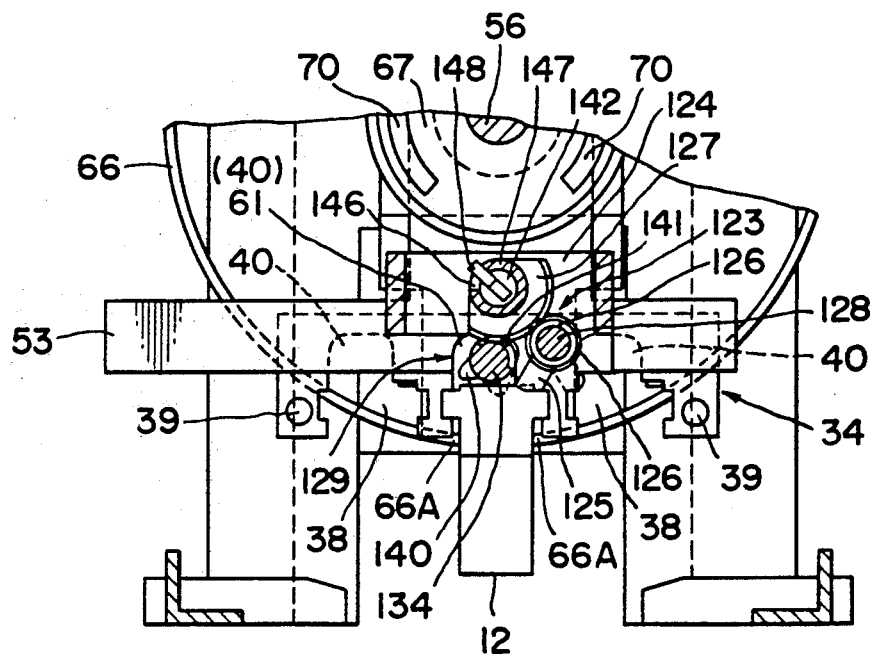
FIG. 14 is a partial plan view, partly in section, illustrating major component parts.
FIG. 15 is a sectional view, on an enlarged scale, of a chuck.
Figure 16:
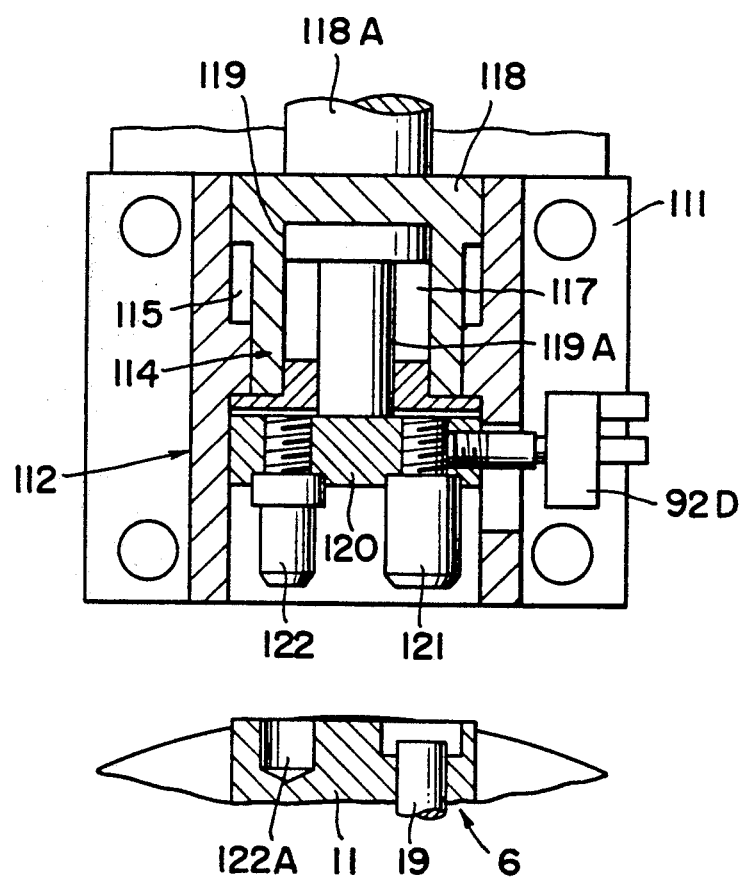
FIG. 16 is a partial front view, on an enlarged scale, illustrating the relationship between a jaw removing cylinder and a chuck.

The construction of the chuck 6 is shown in detail in FIG. 15. A wedge piece 7 is fitted into the center portion of the chuck 6 in such a way that the wedge piece 7 is slidable in the direction of the axis of rotation of the chuck and is connected through a draw bar 8 to a piston rod of a hydraulic cylinder (not shown) mounted at the rear end of the main spindle 3. A sliding member 11 and a sliding portion 13 of a jaw 12 are fitted respectively into a slide groove 9 and a jaw mounting groove 10 of the chuck main body. These grooves 9 and 10 extend in the radial direction of the main body in such a way that the sliding member 11 and the sliding portion 13 of the jaw 12 can slide in the radial direction. It will be understood that the present invention is described as being applied to a chuck with three jaws, but is not limited thereto. A wedge portion 14 having a T-shaped cross section and formed at the side of the center portion of the sliding member 11 is fitted into a wedge groove 7a of T-shaped cross section formed in the wedge piece 7. As shown in FIG. 16, a positioning hole 122A is formed in the outer periphery of the sliding member 11.

An engaging groove 15 is defined at the radially outermost surface of the sliding portion 13 of the jaw 12. The groove 15 extends perpendicular to the direction of the sliding of the jaw 12 over the whole width of the sliding portion 13. A rack 16 is formed on the rear surface of the jaw 12 and is adapted to engage with or disengage from an engaging member 18 by the operation of a jaw mounting or dismounting device 17. The construction of the device 17 for mounting or dismounting a jaw is as follows. Disposed within the sliding member 11 are the engaging member 18 which is permitted to slide only forwardly or backwardly, and an operating pin 19 which is permitted to slide only in the radial direction of the sliding member 11. The engaging member 18 has a rack 20 defined at the front surface thereof and normally biased under the force of a bias spring 21 to engage with the rack 16 of the jaw 12. The engaging member 18 and the operating pin 19 are engaged with each other at their tapered engaging surfaces so that when the operating pin 19 is pushed into the chuck main body 6 toward the center thereof, the engaging member 18 is forced to retract while compressing the bias spring 21 so that the racks 16 and 20 are brought out of mesh with each other. When the operating pin 19 is returned to its initial position, the engaging member 18 is advanced under the force of the bias spring 21, and the racks 16 and 20 are brought again into mesh with each other as disclosed in the above-mentioned Japanese Patent Publication (Kokoku) No. 63-15086.

As shown in FIG. 15, the radially inner end of the operating pin 19 is in opposing relationship with a recess 22 formed in the outer peripheral surface of the wedge piece 7. When the operating pin 19 is pushed radially inwardly, its inner end is fitted into the recess and when the wedge piece 7 is displaced backwardly, the inner end of the operating pin 19 is forced to move out of the recess 22. Thus the engagement between the racks 16 and 20 is ensured. A set pin 23 is fitted into the engaging member 18 to be slidable forwardly and backwardly. The set pin 23 is prevented from slipping out by a pin 25. The set pin 23 is biased by the force of a bias spring 24 in the forward direction, and the tip end of the set pin 23 is in mesh with the teeth of the rack 16 at the rear surface of the jaw 12, so that the jaw 12 is normally maintained in an engagement position.

The chuck 6 with the above-described construction has its jaw mounting groove 10 indexed at a predetermined jaw change position C (which is shown above the axis of rotation, but the present invention is not limited to such position C and a suitable other position may be selected as desired) and is maintained at the indexed position by an indexing device (not shown) controlled by proximity switches, NC control device and so on (not shown).

Figure 4:
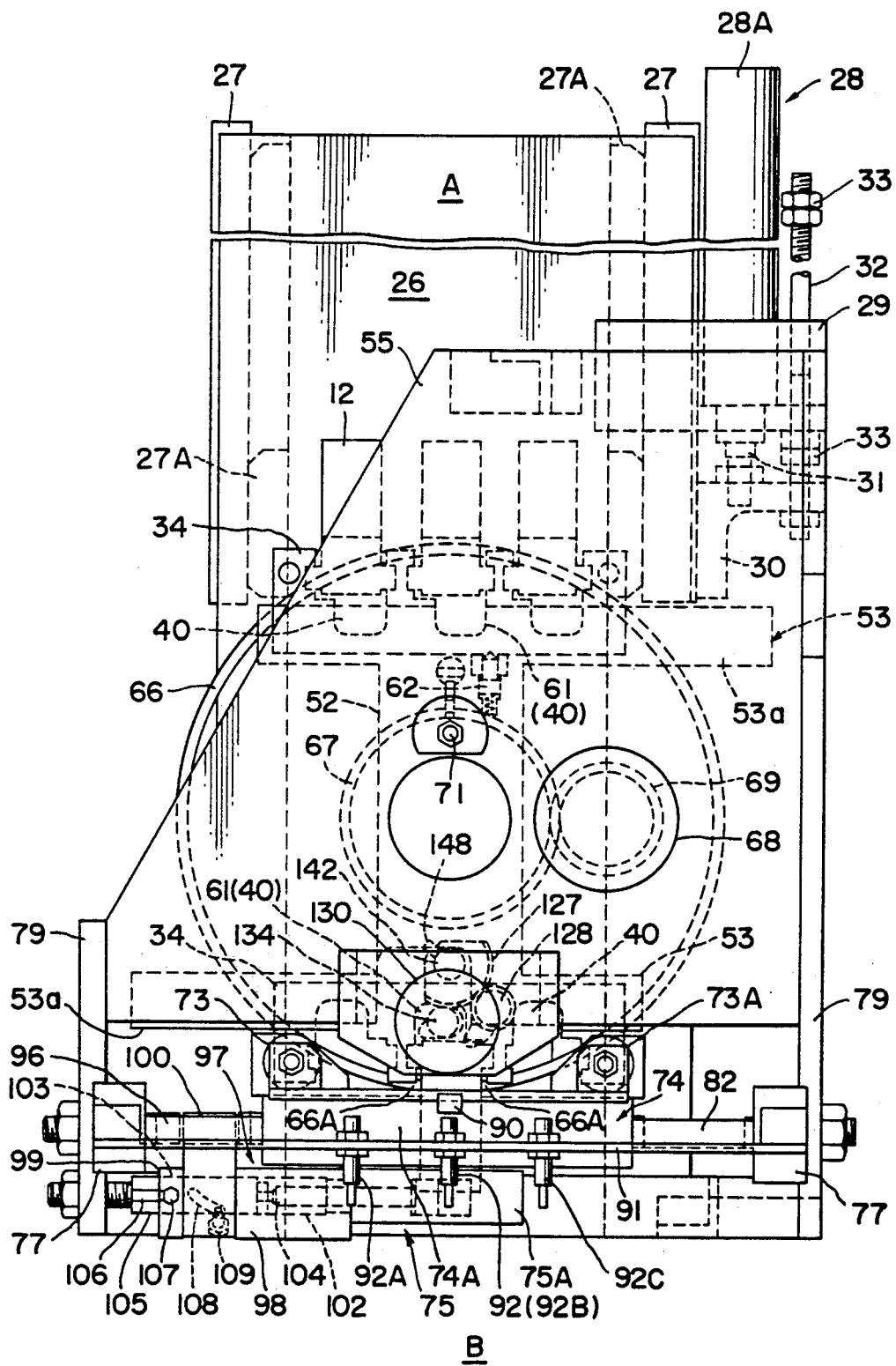
FIG. 4 is a top plan view thereof.

Next, the automatic chuck jaw changer in accordance with the present invention will be described. In FIGS. 3 and 4, reference numeral 27 designates a pair of guide rails extended in the forward and backward direction of the base. A guide table 26 is slidably engaged with the guide rails 27 through sliding member 27A such as sliders, bearings or the like. A forwardly or backwardly movable hydraulic cylinder 28 is mounted on the table 26 through a bracket 29. The forward end of the piston rod 31 of the cylinder 28 is securely attached to an L-shaped connecting member 30 which in turn is securely attached to the base 2. Therefore, when fluid under pressure is supplied into the cylinder 28, a cylinder barrel 28A thereof is caused to move forwardly or backwardly so that the table 26 is reciprocated by a predetermined stroke. There is provided a stopper bolt 32 for limiting the stroke of the cylinder 28. The proximal end of the stopper bolt 32 is also securely attached to the L-shaped connecting member 30 and extends through the bracket 29. Lock nuts 33 are threadedly engaged with the stopper bolt 32 at is suitable front and rear positions. The bracket 29 engages with the front or rear lock nut 33 and consequently the forward end and the backward end of the stroke of the table 26 are determined. Various component parts to be described in detail hereinafter are mounted on the table 26. Here it is pointed out that in FIG. 4 the table 26 is at the forward end of its stroke.

Figure 7:
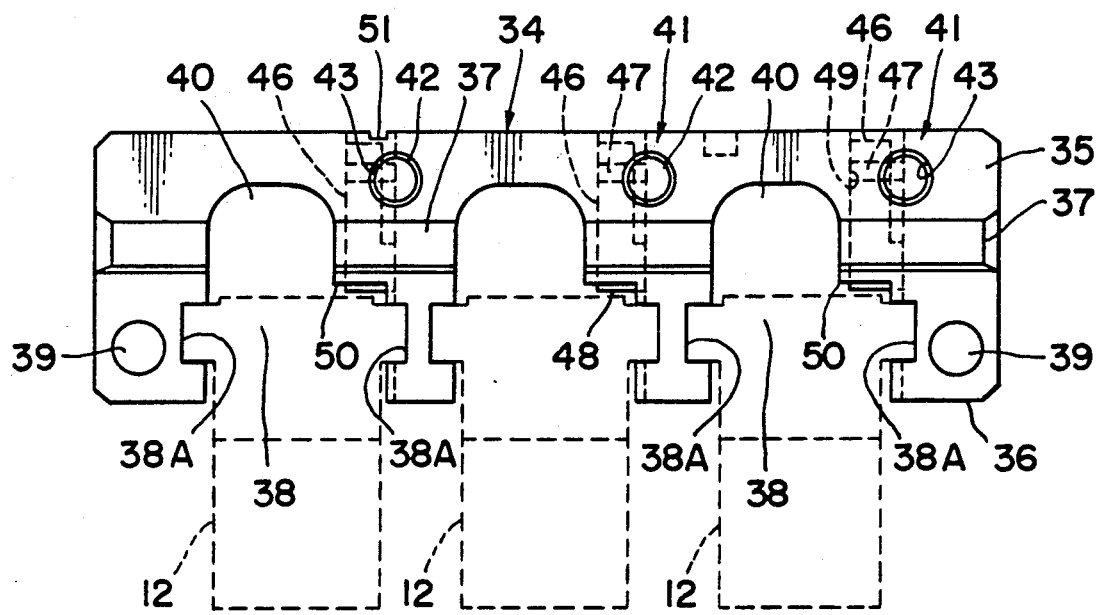
FIG. 7 is a plan view, on an enlarged scale, of a magazine.
Figure 8:
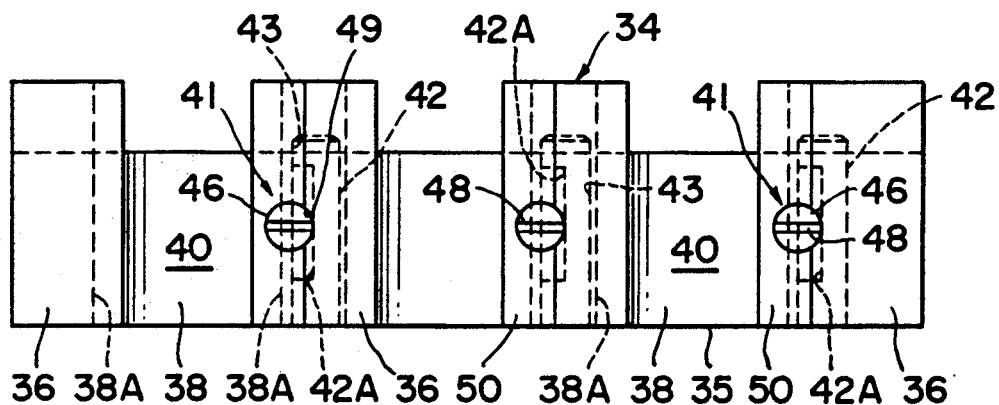
FIG. 8 is a front view, on an enlarged scale, of the magazine.
Figure 9:
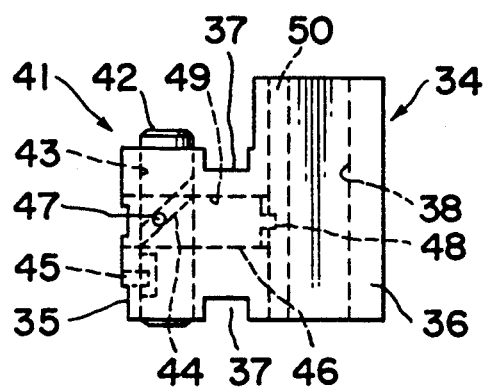
FIG. 9 is a left side view, on an enlarged scale, of the magazine.

Next, with reference to FIGS. 7, 8 and 9, a magazine 34 will be described which removably engages with a new jaw 12 and an old jaw 12 pulled out of the jaw mounting groove 19 ;of the chuck and stores the old jaw. The magazine 34 comprises a guide portion 35 and an engaging portion 36. Between the engaging portion 36 and the guide portion 35 are defined guide recesses 37 which are in vertically opposing relationship with each other. There are provided three storage grooves 38 each of which has an opened front end and opened upper and lower portions. The grooves are spaced apart from each other by a suitable distance in the engaging portion 36. The right and left sides (as viewed in FIG. 7) of each storage groove 38 have engaging grooves 38A for engaging the sliding portions 13 of the jaw to be engaged with and stored in the storage groove 38. Positioning holes 39 are formed in the upper surface at both ends of the engaging portion 36 in order to determine the position of the magazine 34 and maintain it at this position at the jaw changing position B (See FIG. 4). When the jaws are changed, a carrier rod 134 (FIG. 2) passes through a passage 40 which extends from each storage groove 38 into the guide portion 35.

Each storage groove 38 is provided with an engaging mechanism 41 for preventing the jaw 12 inserted into the storage groove 38 from falling therefrom. The mechanism comprises actuating shafts 42 each of which is slidably fitted into a vertical through hole 43 in FIGS. 8 and 9. An intermediate portion of the actuating shaft 42 between the ends thereof is cut out at a depth substantially equal to half the diameter of the actuating shaft 42, to form a sliding surface 42A formed with an inclined cam groove 44. The whole length of the actuating shaft 42 is so determined that the actuating shaft 42 is extended beyond the upper or lower surface of the guide portion 35 by a predetermined length and the actuating shaft 42 is prevented from slipping down by a pin 45.

There is provided an engaging shaft 46 formed with a sliding surface similar to the sliding surface 42A of the above-described actuating shaft 42, and a cam pin 47 is extended from the sliding surface. One end of the engaging shaft 46 terminates in an engaging lug 48. The cam pin 47 of the engaging shaft 46 is fitted into the cam groove 44 of the actuating shaft 42, and the engaging shaft 46 is inserted into a receiving hole 49 of the guide portion 35 in such a manner that the shaft 46 is perpendicular to the actuating shaft 42 and both the sliding surfaces are in contact with each other. Because of the sliding surfaces, the shaft 42 and 46 are prevented from rotating.

Next, the mode of operation of the engaging mechanism 41 with the above-described construction will be described. In response to the vertical movement of the actuating shaft 42, the engaging shaft 46 is caused to advance or retract in a manner to be described below. That is, as shown in FIG. 9, when the upper end of the actuating shaft 42 is extended beyond the upper surface of the guide portion 35, the engaging shaft 46 is retracted so that the forward end of the engaging member 48 extends only slightly into a notch 50 in communication with the storage groove 38. On the other hand, when the operating shaft 42 is pushed downwardly, the engaging shaft 46 is advanced into the storage groove 38 and engages with the rack 16 of the jaw 12 mounted in the storage groove 38. Referring especially to FIG. 7, reference numeral 51 represents a notch for determining a position when the magazine 34 is fitted in a holding member 53 on a jaw changing arm 52 (FIG. 1) to be described in more detail below.

As shown in FIG. 1, the jaw changing arm 52 has on each of the two ends thereof a holder 53 for removably holding the magazine. An indexing device 54 is provided for the changing arm 52. The indexing device 54 indexes the arm 52 to a position A at which the magazine is mounted or detached and to a position B at which a jaw is changed. The jaw changing arm 52 has a vertical rotating shaft 56 which in turn is rotatably supported by the table 26 and a top plate 55. As best shown in FIG. 4, the magazine holders 53 and the jaw changing arm 52 are disposed mutually perpendicularly. Each holder 53 is of a C-shaped cross section and has a guide groove 57 and upper and lower projection 58 in vertically opposing relationship with each other. The holder 53 has a length along which the magazine 34 held therein can be slidingly traversed in a manner to be described in detail below. As shown in FIG. 4, the holder 53 has a magazine insertion side 53a which is longer than the other side by a predetermined length to provide a traverse margin when the storage grooves 38 of the magazine 34 are sequentially located at the jaw changing position. Thus the holder 53 is asymmetrical. According to the preferred embodiment, as best shown in FIG. 4, the holder 53 is so designed and constructed that at the magazine mounting or dismounting position A, the right side portion 53a of the changing arm 52 is longer, while at the jaw changing position B the left side portion 53a is longer.

Figure 10:
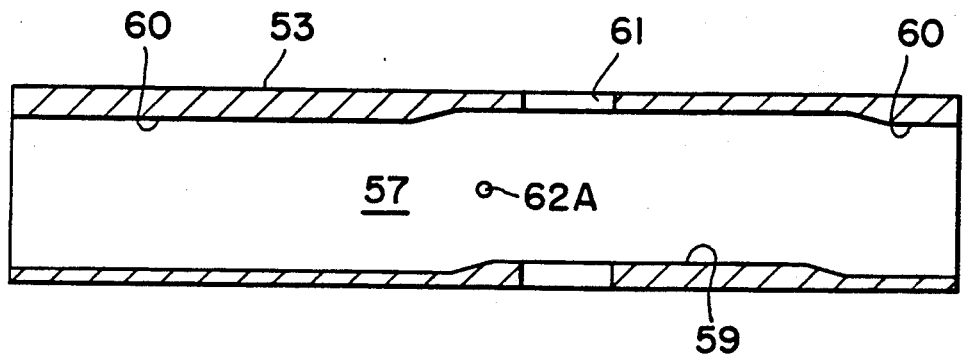
FIG. 10 is a longitudinal sectional view, on an enlarged scale, of a magazine holder.

As best shown in FIG. 10, in order to actuate the actuating shaft 42 of the magazine 34, the upper and lower inner surfaces of the guide groove 57 of the magazine holder 53 are so configured that the lower surface has a push-up portion 59 and the upper surface has push-down portions 60. When the magazine 34 inserted in the holder 53 is located at the push-down portions 60, the actuating shaft 42 remains in pushed-down position so that the jaw 12 in the storage groove 38 is retained by the engaging lug 48 of the engaging shaft 46. When the magazine 34 is traversed to the position of the push-up portion 59 under the above-described condition, the actuating shaft 42 is caused to move upwardly so that the engaging shaft 46 is retracted and the jaw 12 is released from the engaging lug 48. Passages 61 are sequentially aligned with the passage 40 of the storage groove 38 as the magazine 34 is traversed in the holder 53. In the case of the jaw change at the jaw changing position B, the carrier rod 134 is passed through the passages 61. Reference numeral 62A in FIG. 10 designates a hole through which is extended a known notch pin 62 (See FIG. 1) projecting from the jaw changing arm 52 for temporarily position the magazine 34 mounted in the holder 53 and which is further adapted to prevent play of the magazine 34 within the guide groove 57 when the jaw changing arm 52 is rotated.

Figure 5:
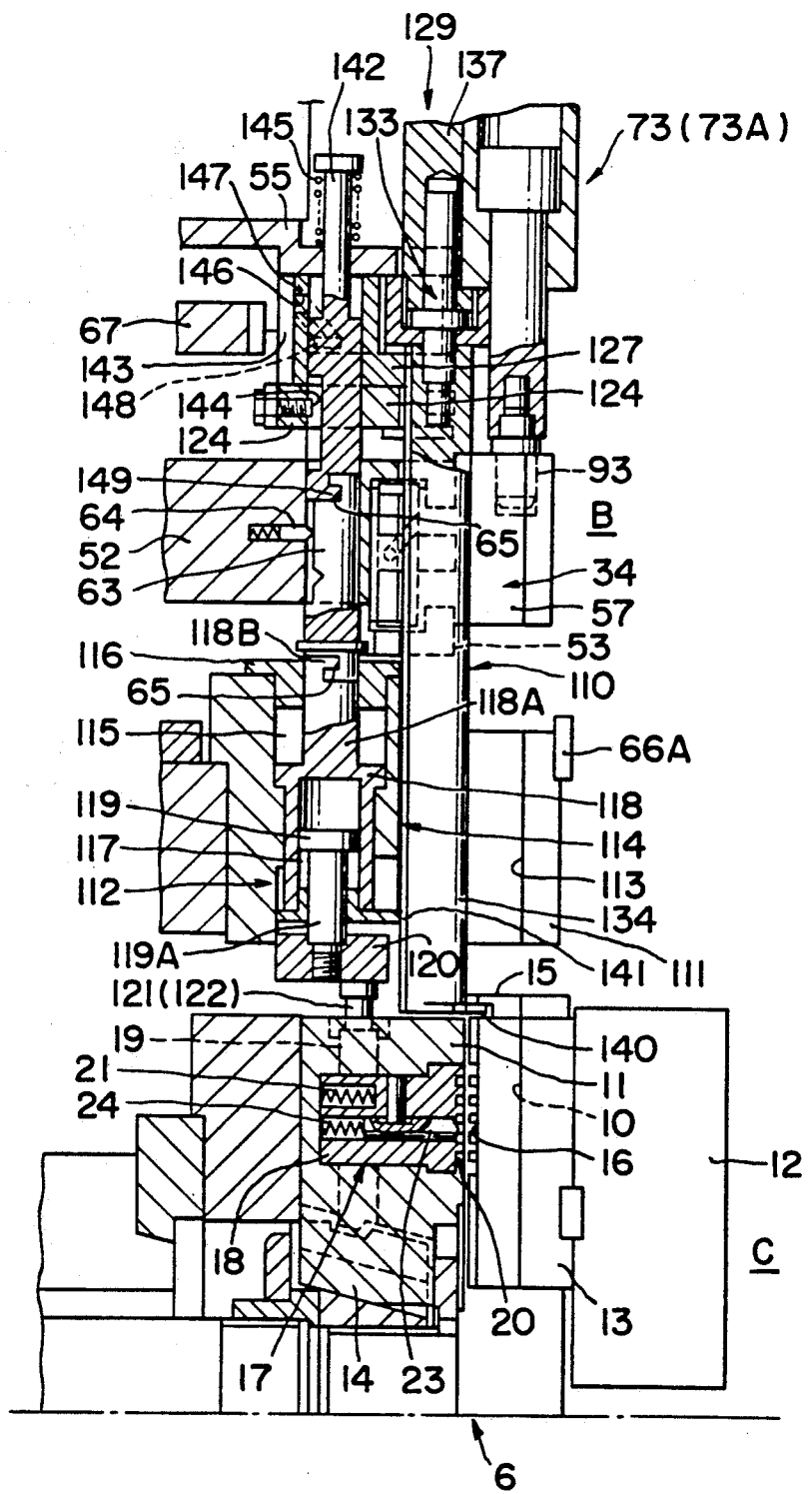
FIGS. 5 and 6 are partial views on an enlarged scale, respectively, of FIG. 2 used to explain the mode of operation.

Referring next to FIG. 1 and particularly to FIG. 5, reference numeral 63 designates an idle pin passing through the jaw changing arm 52 and adapted to be positioned by a notch engaging pin 64 with respect to the holder 53, the idle pin 63 being prevented from being rotated and slidable relative to the arm 52. The upper and lower ends of the idle pin 63 has engaging grooves 65. These engaging grooves 65 are caused to engage with an engaging projection 118B on the upper end of a first piston rod 118A of a jaw removing cylinder 114 and with an engaging projection 149 on the lower end of a draw shaft 142, respectively, when each magazine holder 53 comes to the jaw change position B as a result of rotary movement of the jaw changing arm 52. As a result of the engagement, the idle pin 63, the first piston rod 118A and the draw shaft 142 are interconnected into a unitary construction.

As most clearly shown in FIGS. 1 and 4, an annular guide rail 66 is mounted on the table 26 below the jaw changing arm 52 along the locus of rotation of the holder 53. The guide rail 66 is adapted to support the jaw 12 during the rotation of the arm 52, to prevent the jaw from falling from within the engaging groove 38 of the holder 53. As best shown in FIG. 3, the guide rail 66 is formed with a cutout 66A at the jaw changing position B and its width is reduced as practically as possible within the range in which the jaw 12 to be changed is permitted to pass through the cutout 66A.

With reference to FIGS. 1 and 4, an indexing device 54 will be described. An indexing gear 67 is carried by the upper end of the rotating shaft 56 and is in mesh with a driving gear 69 (See FIG. 4) mounted on the driving shaft of an indexing motor 68 mounted on the top plate 55. Detection of the indexing angle is made by a proximity switch 71 mounted on the top plate 55 and a detector element 70 mounted on the upper surface of the indexing gear 67. It must be pointed out here that the present invention is not limited to the indexing device 54 of the type described above and that any means capable of locating the jaw changing arm 52 to a predetermined indexed position may be used.

The construction of a traversing device 72 (FIG. 3) will be described. The traversing device 72 is disposed above the magazine 34 indexed to the jaw changing position B and in front of a carrier rod 134 and a stopper shaft 128 to be described in detail below. The traversing device 72 comprises a transversing cylinder 74 and a stop cylinder 75 to be described in detail below.

Figure 12:
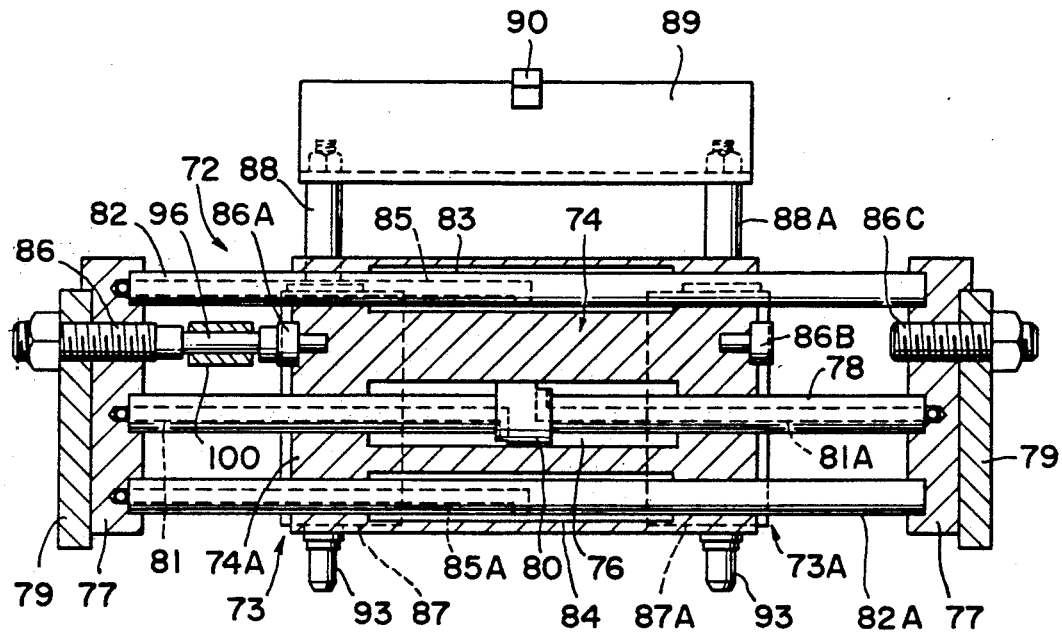
FIG. 12 is a longitudinal sectional view of the traversing device.

First referring to FIG. 12, the construction of the traversing cylinder 74 will be described. A cylinder barrel 74A has a piston chamber 76 defined in an intermediate portion between the ends thereof and a piston 80 from which extend piston rods 78 whose ends are securely attached to side plates 77, respectively, which in turn are securely attached to mounting plates 79, respectively, fixed to the top plate 55. The piston 80 divides the piston chamber 76 into two chamber sections. Passages 81 and 81A for supplying fluid under pressure are extended from the ends of the piston rods 78 coaxially of the axis thereof in mutually opposing relationship. These supply passages 81 and 81A are opened at the opposite sides of the piston 80 which divides the cylinder chamber into two sections as described above. It is apparent therefore when the fluid under pressure is charged into and discharged from the chamber 76 the cylinder barrel 74A is traversed along the piston rods 78. The length of the piston rods 78 is so determined that it is at least two times as long as the pitch of the storage grooves 38 of the magazine 34.

Reference numeral 82 and 82A represent rotation preventive rods which are extended through the cylinder barrel 74A and of which the both ends are securely fixed to the side plates 77, respectively. The cylinder barrel 74A are therefore slidable with respect to the rods 82 and 82A. Reference numerals 83 and 84 designate storage chambers for storing therein fluid under pressure, which chambers are disposed to surround the rods 82 and 82A and of which the length is substantially equal to or longer than that of the piston chamber 76. Passages 85 and 85A for charging or discharging the fluid under pressure are extended through the rods 82 and 82A, respectively, coaxially thereof and each is opened substantially at the mid-point between the ends of the rod 82 or 82A so as to be communicated with the storage chambers 83 and 84, respectively, which in turn are communicated with the interiors of lock cylinders 73 and 73A, respectively. In FIG. 12, reference numerals 86, 86A, 86B and 86C are stopper pins.

Figure 11:
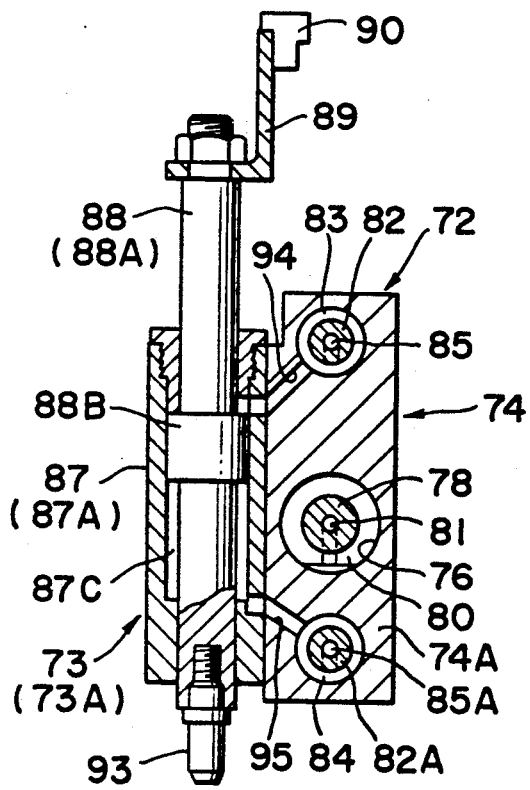
FIG. 11 is a partial sectional view, on an enlarged scale, of a traversing device.

Next, the lock cylinders 73 and 73A will be described. As best shown in FIG. 11, they comprise a pair of cylinder barrels 87 and 87A which in turn are integrally attached to the cylinder barrel 74A of the traversing cylinder 74. Their distance and positions are so determined that the spacing between the piston rods 88 and 88A is equal to the distance between the positioning holes 39 of the engaging portion 36 of the magazine 34 and that when the magazine 34 is indexed at the jaw changing position B, they are located immediately above the positioning holes 39, respectively. The piston rods 88 and 88A of the lock cylinders 73 and 73A are of the so-called dual rod type extending through the upper and lower end plates of the cylinders. A detection dog 90 is mounted at the center of a mounting plate 89 disposed between the upper ends of the piston rods 88 and 88A, and proximity switches 92, 92A, 92B and 92C (See FIGS. 3 and 4) for detecting the upper stroke ends and the lower stroke ends and the traversed distance of the lock cylinders 73 and 73A are securely mounted on a mounting plate 91 (See FIGS. 2, 3 and 4) securely attached to the side plates 77. A lock pin 93 is threadedly engaged with the lower end of each of the piston rods 88 and 88A. The storage chambers 83 and 84 and the cylinder bore 87C of the lock cylinders 73 and 73A are communicated through the passages 94 and 95 in such a way that the storage chamber 83 communicates with the upper chamber section divided by the piston 88B while the storage chamber 84 is communicated with the lower chamber section as shown in FIG. 11. When fluid under pressure is charged into the storage chambers 83 and 84, the piston rods 88 and 88A are caused to move vertically. As described above, the storage chambers 83 and 84 are defined along the outer peripheries of the rods 82 and 82A and their length is substantially equal to or slightly greater than the piston chamber 76 so that even if the traversing cylinder 74 is located at any position, the communication between the charging or discharging passages 85 and 85A on the one hand and the storage chambers 83 and 84 on the other hand is not interrupted.

The construction of the stopper cylinder 75 will next be described. The stopper cylinder 75 operates to cause a spacer rod 96 (FIG. 12) to extend into or retract from the space between the stopper pins 86 and 86A as needs demand, thereby limiting the traverse stroke of the traversing cylinder 74 and positioning it at one of three positions. In FIGS. 3 and 4, there is provided a base 97 upon which is mounted the stopper cylinder 75 and which is attached to the top plate 55 in front of the traversing cylinder 74 and at the lefthand end portion in these figures. The mounting base 97 has a screw engagement portion 98 for threaded engagement with the stopper cylinder 75 and a rotation preventive member 99 in opposing relationship with the end of the screw engagement portion 98, and a space 101 for insertion of a spacer arm 100 is interposed therebetween. The screw engagement portion 98 is formed with a screw threaded hole 102 for screw-engaging with the stopper cylinder 85, and the rotation preventive member 99 is formed with a guide hole 103 for an actuating rod 105. The stopper cylinder 75 is securely attached to the screw engagement portion 98 by screw-engaging a cylinder barrel 75A with the internally threaded hole 102. The actuating rod 105 connected to the piston rod 104 of the stopper cylinder 75 is passed through the internally threaded hole 102 and guided by the guide hole 103, and a screw 107 threadedly engaged with the rotation preventive member 99 is inserted into a key groove 106 formed at the end portion of the actuating rod 105 so that the rotation of the rod 105 is prevented. The outer peripheral surface of the actuating rod 105 is formed with an inclined cam groove 108 extended in the axial direction and in opposing relationship with the mounting portion 101.

The spacer arm 100 is rotatably fitted over the actuating rod 105 within the mounting portion 101 and its sliding movement in the axial direction is prevented by the end of the screw engagement portion 98 and the rotation preventive member 99. A spacer rod 96 having a predetermined length is fitted in the distal end of the spacer arm 100. Reference numeral 109 designates a cam pin which is screw-engaged with a boss portion of the spacer arm 100 and is fitted into the cam groove 108. Therefore, when the stopper cylinder 75 is actuated to advance or retract the piston rod 104, the spacer arm 100 is caused to rotate from a position indicated by imaginary lines in FIG. 2 to a position indicated by solid lines so that as shown in FIG. 12 the spacer rod 96 is inserted between the stopper pins 86 and 86A and consequently the traverse motion of the traversing cylinder 75 is interrupted.

Finally, component parts of a jaw changing device 110 (FIG. 2) will be described. The device 110 operates to change the jaw 12 between the engaging groove 38 of the magazine 34 positioned at the jaw changing portion B by the traversing device 72 in the manner described above and the jaw mounting groove 10 indexed to the jaw changing position C as described above. As shown in FIG. 2, a jaw guide block 111 is mounted on the table 26 and is formed with a jaw guide groove 113. When the table 26 reaches the forward stroke end in the manner described before, the guide groove 113 is located above the jaw mounting groove 10 of the chuck 6 indexed at the jaw changing position C, and the storage groove 38 of the magazine 34 is positioned at the jaw changing position B in such a way that the positions C and B are aligned with each other, thereby allowing the sliding portion 13 of the jaw 12 to pass through the guide groove 13.

A jaw removing device 112 is formed integral with the jaw guide block 111 and operates to push inwardly the operating pin 19 of the jaw mounting and dismounting device 17 of the chuck 6 as will be described below. Reference numeral 114 represents a jaw removing hydraulic cylinder constructed by utilizing the jaw guide block 111 and is in the form of a double cylinder as shown in FIGS. 5 and 16 so that a longer stroke can be attained than the length along which the jaw removal cylinder 114 is mounted. That is, a cylinder chamber 115 in the guide block 111 is closed by a cover plate 116 and slidably receives therein the first piston 118, and a second cylinder chamber 117 is also formed into which is fitted a second piston 119. Piston rods 118A and 119A are extended through the piston chambers 115 and 117 upwardly and downwardly, respectively, and the pistons 118 and 119 are normally located at their uppermost stroke ends as best shown in FIGS. 1 and 2.

A mounting member 120 is securely attached to the lower end of the piston rod 119A of the second piston 119, and a push pin 121 projects from the lower surface of the mounting member 120 in correctly aligned relationship with the operating pin 19 of the chuck 6 indexed at the jaw changing position C. When the first and second pistons 118 and 119 are moved downwardly, the operating pin 19 is pushed down by the push pin 121 so that the rack 20 of the engaging member 18 is brought out of mesh with the rack 16 of the jaw 12. When the pistons 118 and 119 are moved downwardly as described above, a positioning pin 122 projecting downwardly from the mounting member 120 as best shown in FIGS. 3 and 16 is brought into engagement with the positioning hole 122A of the chuck 6 so that the chuck 6 can be more correctly indexed. As described hereinbefore, the engaging projection 118B extends from the upper end of the piston rod 118 of the first piston 118 and mates with the engaging groove 65 at the lower end of the idle pin 63 which in turn is disposed in the jaw changing arm 52.

Figure 6:
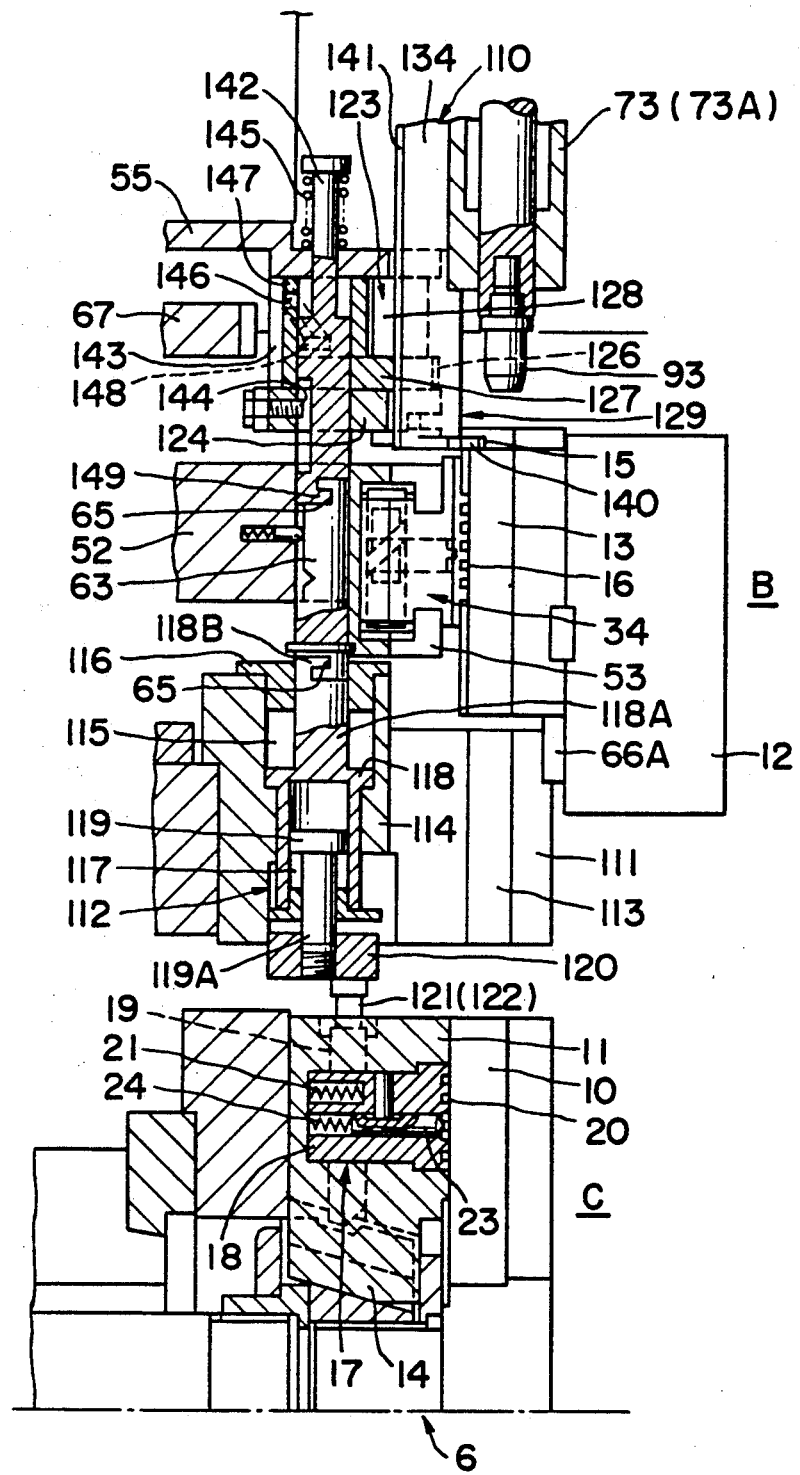

A jaw receiving device 123 shown in FIGS. 1 and 2 operates to prevent the jaw 18 from dropping from the engaging groove 38 of the magazine 34 positioned at the jaw changing position B and has the following construction. As shown in FIG. 6, a stopper shaft 128 is rotatably supported by the top plate 55 and a supporting frame 124 depending from the lower surface of the top plate 55 and carries an engagement member 125 (FIGS. 3 and 14) and a gear 126 at the lower end thereof. The gear 126 is in mesh with a segment gear 127 rotatable in the clockwise or counterclockwise direction of the jaw removing device to be described in more detail hereinafter. In an inoperative mode, the engagement member or hook 125 is located at a position indicated by the solid line in FIG. 14 and is inserted into an engaging groove 15 of the jaw 12 fed to a position immediately before the jaw changing position (that is, a position immediately before the cutout portion 66A of the rail 66) in which the jaw 12 is supported by the rail 66 so that the dropping of the jaw 12 from the storage groove 38 of the magazine 34 is prevented.

The last component of the jaw changing device 110 is a jaw mounting or dismounting device 129 which operates to change the jaw 12 between the storage groove 38 of the magazine indexed to the jaw changing position B and the mounting groove 10 of the chuck 6 indexed to the jaw changing position C. The device 129 has the following construction. As shown in FIG. 3, a shift cylinder 130 is mounted on a mounting stand 131 on the top plate 55 immediately above the jaw changing position B. As shown in FIG. 1, the lower end of a piston rod 132 is connected through a connecting means 133 rotatably to a carrier rod 134. The connecting means 133 comprises a connecting ring 135 with an insertion hole formed coaxially thereof and a connecting pin 137 on which is formed an engaging flange 138. The connecting pin 137 is extended through an insertion hole 136 of the connecting ring 135 and is threadedly engaged with the upper end of the carrier rod 134. It therefore follows that the connecting ring 135 is rotatably interposed between the upper end of the carrier rod 134 and the flange 138. The upper end of the connecting pin 137 is inserted into a receiving bore 139 formed coaxially in the piston rod 132, while the connecting ring 135 is threadedly engaged with the piston rod 132 so that the carrier rod is rotatably connected to the piston rod 132 coaxially thereof.

The carrier rod 134 is located immediately above the passage 40 of the magazine 34 in alignment with the passages 61 (FIG. 10) of the holder 53 indexed at the jaw changing position B. The lower end of the carrier rod 134 carries an engaging member 140, and about one half of the peripheral surface of the engaging member 140 is formed with a long gear 141 which is in mesh with the segment gear 127 as in the case of the gear 126 of the stopper rod 128 described above (See FIG. 14). Upon actuation of the shift cylinder 130, the carrier rod 134 is vertically moved between the upper and lower stroke ends shown in FIGS. 5 and 6 and is also rotated in the clockwise or counterclockwise direction by the segment gear 127 so that the engaging member 140 is rotated as indicated by the solid line and the imaginary line in FIG. 14. When the engaging member 140 is located at the position indicated by the imaginary line at both the upper stroke end and the lower stroke end, it is inserted into the engaging groove 15 of the jaw 12 held by the magazine 34 or by the chuck 6 indexed at the jaw changing position B or C so that the jaws are changed between the storage groove 38 and the mounting groove 10.

The segment gear 127 is mounted to be rotatable in the clockwise or counterclockwise direction in a manner described below. In FIGS. 5 and 6, reference numeral 142 represents a draw shaft having a large-diameter section and a small-diameter section which is vertically slidably supported between the top plate 55 and a supporting plate 124 extended from a gear mounting member 143 depending from the top plate 55, and the rotation of the draw shaft 142 is prevented by a key 144. The draw shaft 142 is normally upwardly biased under the force of a spring 145 loaded between the top flange of the small-diameter section and the top plate 55 so that it is normally located at the upper stroke end (See FIGS. 1 and 2). A long boss 147 is extended from the upper surface of the segment gear 127 and is loosely fitted over the largediameter section of the draw shaft 142 so that the boss 147 is rotatably disposed on the supporting plate 124. The upper stroke end of the movement in the axial direction of the draw shaft 142 is defined at a position at which the upper end of the large-diameter section of the shaft 142 is brought into contact with the top plate 55 while the lower stroke end is defined at a position at which the lower surface of the segment gear 127 is brought into contact with the supporting plate 124. The segment gear 127 is in mesh not only with the long gear 141 of the carrier rod 134 but also with the gear 126 carried by the stopper shaft 128. The boss 147 of the segment gear 127 is formed with a cam groove 146 inclined at a predetermined angle with respect to the axial direction. A cam pin 148 projecting from the largediameter section of the draw shaft 142 is fitted into the cam groove 146, so that in response to the vertical movement of the draw shaft 142, the segment gear 127 is rotated in the clockwise direction or the counterclockwise direction, whereby both the carrier rod 134 and the stopper shaft 128 in engagement with the segment gear 127 are rotated in unison. As described before, the engaging projection 149 is extended from the lower end of the draw shaft 142 for engagement with the engagement groove 65 of the idle pin 63.

Next, the mode of the jaw changing operation and the mode of a preparatory operation by the jaw changer with the above-described construction in accordance with the present invention will be described. When the machine tool 1 is carrying out its machining operation, the jaw changer in accordance with the present invention remains in the inoperative position in which the table 26 is at the most retracted position shown in FIG. 1. In this case, one magazine holder 53 of the jaw changing arm 52 is maintained at the mounting or dismounting position A while the other magazine holder 53 is directed toward the jaw changing position B opposite to the position A. The magazine 34 holding jaws to be changed is mounted on the magazine holder 53 at the mounting or dismounting position A while the empty magazine 34 for receiving the jaws 12 which have been used are mounted on the other holder 53 (Both magazines 34 are not shown in FIG. 1.). The idle pin 63 on the side of the holder 53 upon which is mounted the empty magazine 34 are engaged with the draw shaft 142 and the piston rod 118 as a unitary construction.

In this embodiment, the mounting or dismounting of the magazine 34 on or from the holder 53 is carried out at the mounting or dismounting position A while the jaw changer remains in its inoperative position. For instance, the magazine mounting is carried out as follows. Of magazines stored in a predetermined place such as a tool magazine of a machining center or an automatic warehouse, a desired magazine 34 is automatically selected and then automatically mounted on the holder 53. Whether such full automatic mounting operation, a semi-automatic operation or a manual operation is used is determined depending upon the machining operation and other factors. It is to be understood that the magazine mounting method is not included in the present invention and that the mounting position is not limited to the position A.

The magazine 34 mounted on the magazine holder 53 has its guide portion 35 fitted into the guide groove 57 of the holder 53 and its engaging recesses 37 engaged with the engaging projections 58 of the holder 53, so that the magazine 34 is mounted on the holder 53 with a high degree of accuracy. In FIG. 4, the magazine 34 is inserted from the right side on the magazine holder 53 at the mounting or dismounting position A, is traversed within the holder 53 until the notch pin 62 (FIG. 1) engages with the notch groove 51 (FIG. 7) at the rear surface of the magazine 34 and then stopped. In this case, the passage 40 of the center storage groove 38 is aligned with the passages 61 of the magazine holder 53. The upper and lower surfaces of the guide groove 57 of the magazine holder 53 are provided with the push-up portion 59 and the push-down portion 60, and the actuating shaft 42 and the engaging shaft 46 of the magazine 34 are arranged in the manner described before so that the engaging shaft, 45 of the center storage groove 38 of the magazine 34 inserted into the holder 53 is retracted and the engaging lug 48, extended from the forward end of the retracted engaging shaft 46 is retracted from the storage groove 38. The engaging lugs 48 of the other engaging shafts 46 are extended into the storage grooves 38. As a result, the jaw 12 stored in the center storage groove 38 is disengaged, but it is supported by the guide rail 66 so that it is prevented from dropping from the storage groove 38. On the other hand, when the center storage groove 38 is empty, it becomes possible to load a jaw 12 into the groove because the engaging lug 48 and the jaw 12 do not interfere with each other.

In response to the jaw changing command from a command device depending on the change of a work to be machined or other factors, the main spindle 3 is decelerated and stopped. After one jaw 12 mounted on the chuck 6 is indexed at the jaw changing position C, the hydraulic cylinder (not shown) is energized so that the wedge piece 7 is forced to advance forwardly and consequently three jaws 12 are located at the changeable position (that is, the position at which a work is released) as in the case of conventional jaw changers. When the chuck 6 is indexed to a predetermined position in the manner described before, the forwardly or backwardly movable cylinder 28 is actuated so that the table 26 retracted at the position shown in FIG. 1 is advanced as indicated in FIG. 2 so that the whole jaw changing device is brought to a position at which the jaw changing operation is carried out. Then, the magazine holder 53 upon which is mounted an empty magazine 34 and which has been in opposing relationship with the jaw changing position B is brought to the jaw changing position B. In this case, the lock cylinders 73 and 73A of the traversing device 72 are raised as shown in FIG. 2 and the cylinder barrel 74A of the traversing cylinder 74 is located at an intermediate position between the ends of the piston rod 78 (See FIG. 13). Furthermore, the spacer arm 100 of the stopper cylinder 75 is rotated as indicated by the solid line in FIG. 2 so that the spacer rod 96 is advanced between the stopper pins 86 and 86A and waits for the first change of the jaw (removal of the jaw from the chuck).

When the indexing operation is accomplished in the manner described before, the lock cylinders 73 and 73A are actuated so that the piston rods 88 and 88A are lowered whereby the lock pins 93 threadedly engaged with the lower ends thereof are brought into engagement with the positioning holes 39 of the magazine. As a result, the center storage groove 38 among the three storage grooves 38 of the magazine 38 is correctly located at the jaw changing position (See FIG. 13), and the lower ends of the movement of the piston rods 88 and 88A of the lock cylinders 73 and 73A are detected by the detecting dog 90 and the proximity switch 92B. Almost concurrently with the actuation of the lock cylinders, the shift cylinder 130 is actuated so that the carrier rod 134, which extends through the, passage 40 of the magazine 34 and through the passages 61 of the holder 53 and which is at the uppermost stroke end, is moved downwardly while the long gear 141 on the outer periphery of the carrier rod 134 is kept in mesh with the segment gear 127 and is stopped at the lower stroke end shown in FIG. 5. As a result, the engaging member 140 provided at the lower end of the carrier rod 134 takes a position spaced apart by a short distance from the engaging groove 15 of the jaw 12 mounted on the chuck 6 (See FIG. 14).

After the carrier rod 134 has been moved down to a predetermined position in the manner described above, the jaw removing device 112 is actuated to remove the jaw. First, fluid under pressure is supplied to the jaw removing cylinder 114 such that the first and second pistons 118 and 119 are moved downwardly. As a result, the push pin 121 on the mounting plate 120 of the piston rod 119A of the second piston 119 pushes the actuating pin 19 of the jaw removing device 17 into the chuck 6 at the center thereof, so that the engaging member 18 is retracted as indicated in FIG. 5 and consequently the racks 20 and 16 of the engaging member 18 and the jaw 12 are disengaged from each other. Even when the racks 20 and 16 are disengaged as described above, the set pin 23 engages under the force of the spring 24 with the rack 16 of the jaw 12, thereby preventing the jaw 12 from dropping out of the jaw mounting groove 10.

Concurrently, in response to the rotation of the carrier rod 134 to be described in more detail hereinafter, the engaging member 140 engages with the engaging groove 15 of the jaw 12, thereby preventing the dropping of the jaw 12 out of the jaw mounting groove 10. Concurrently, with the jaw removing operation by the push pin 121 in the manner described above, the positioning pin 122, which is extended downwardly in parallel with the push pin 121 from the mounting member 120, engages with the positioning hole 122A of the sliding member 11 so that the jaw mounting groove 10, the guide groove 113 of the guide block 111 and the storage groove 38 of the magazine 34 are vertically aligned with a high degree of accuracy.

When the jaw removing cylinder 114 is actuated in the manner described above so that the piston rod 118A of the first piston 118 is moved downwardly, the idle pin 63 and the draw shaft 142 which are integrally connected to the piston rod 118A in the manner described above operate as follows. That is, the idle pin 63 is disengaged from the notch pin 64 while the draw shaft 142 is moved downwardly against the force of the spring 145 loaded therearound while compressing the spring 145. When the draw shaft 142 is moved downwardly, the segment gear 127 is rotated in the clockwise direction through a predetermined angle in FIG. 14 because of the engagement of the cam groove 146 and the cam pin 148 fitted therein, so that the carrier rod 134 and the stopper shaft 128 are rotated in the counterclockwise direction.

As a result, the engaging member 140 of the carrier rod 134, which is in opposing relationship with and is spaced apart by a short distance from the engagement groove 15 of the jaw 12 loaded in the chuck 6 is brought to the position indicated by the imaginary line shown in FIG. 14 and then fitted into the engaging groove 15, thereby hooking the jaw 12 (See FIG. 5). Meanwhile the engaging member 125 of the stopper shaft 128 is rotated from the jaw engaging position indicated by the solid line in FIG. 14 to the position indicated by the imaginary line at which the jaw 12 is released. When the jaw 12 is pulled out of the chuck 6, the above-described rotation of the engaging member 125 does not directly associate with the jaw changing operation because the jaw 12 is not engaged with the storage groove 38 of the magazine 34.

As shown in FIG. 5, upon completion of the hooking of the jaw 12 by the engaging member 140 of the carrier rod 134, the shift cylinder 130 is actuated in the reverse direction so that the carrier rod 134 is moved upwardly. As a result, the hooked jaw 12 is pulled out from the jaw mounting groove 10 of the chuck 6 while riding upon the set pin 23, is passed through the cutout 66A of the rail 66 and is guided by the guide groove 113 of the guide block 111 into the storage groove 38 of the magazine 34 as shown in FIG. 6. Then, the shift cylinder 130 is deactivated. When the first jaw 12 is pulled out and then loaded into the storage groove 38 in the manner described above, the jaw removing cylinder 114 is actuated reversely so that the idle pin 63 and the draw shaft 142 are returned to their initial positions, respectively. As a result of the upward movement of the draw shaft 142, the carrier rod 134 and the stopper shaft 128 are rotated through a predetermined angle in the opposite directions so that their engaging members 140 and 125 are returned to the positions indicated by the solid lines, respectively, and consequently the engaging member 140 of the carrier rod 134 releases the jaw 12, but the engaging member 125 of the stopper shaft 128 engages the jaw 12 so that the falling of the jaw out of the engaging groove 38 is prevented. When the jaw removing cylinder 114 is reversed in operation, the pushing action of the operating pin 19 is released and the engaging member 18 is returned to its initial position. As is apparent from the above-described explanation, the magazine 34 still remains on the push-up portion 59 of the holder 53 so that the jaw 12 in the storage groove 38 is not engaged with the engaging lug 48, but is engaged only with the engaging member 125.

Figure 13:
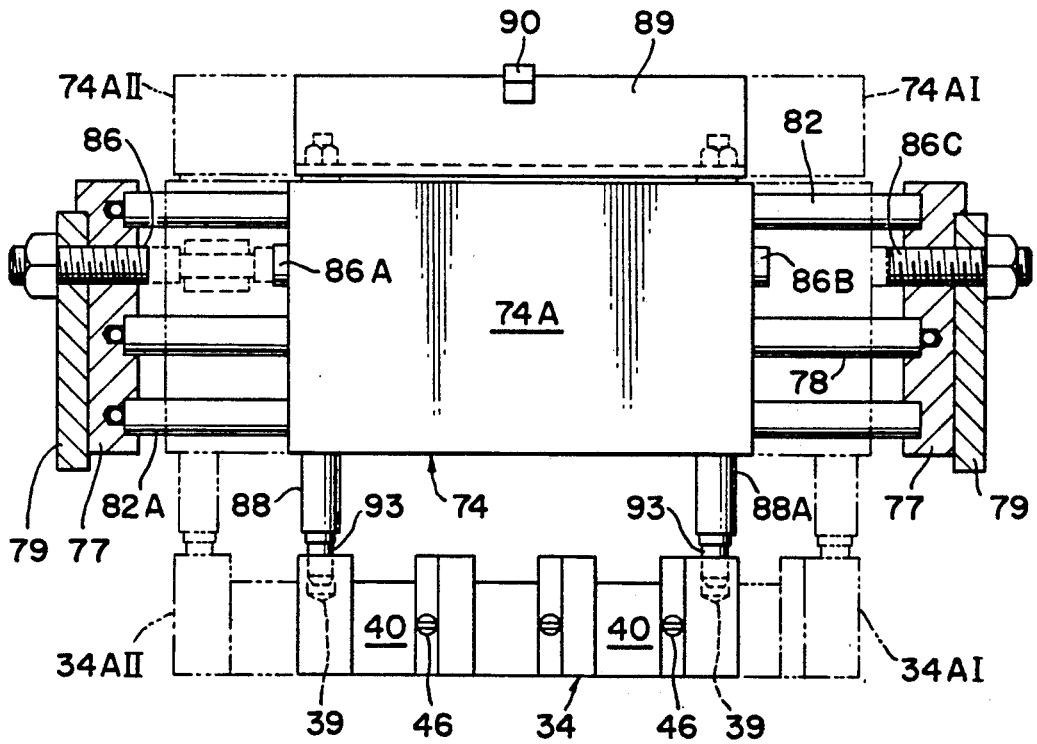
FIG. 13 is a view, on an enlarged scale, used for the explanation of the traversing movement of the magazine.

After the first jaw 12 has been pulled out in the manner described above, the operation for pulling out the second jaw 12 is prepared in the following manner. That is, the chuck 6 is rotated through a predetermined angle, and the jaw mounting groove 10 into which is fitted the second jaw 12 to be pulled out next is indexed to the jaw changing position C. Thereafter, the magazine 34 is traversed within the holder 53 and then the storage groove 38 into which is loaded the jaw 12 is indexed to the jaw changing position B. The traverse of the magazine 34 is effected as follows. That is, after the pull out of the first jaw 12 was accomplished, fluid under pressure is supplied through the righthand fluid passage 81A (FIG. 12) of the piston rod 78 into the right cylinder chamber 76 whereby the cylinder barrel 74A is caused to traverse to the right side because the piston rod 78 is maintained stationary as described above. When the stopper pin 86B abuts against the stopper pin 86C, the proximity switch 92C detects the dog 90 so that the traverse of the cylinder barrel 74 is stopped at the position 74AI in FIG. 13. When the traverse cylinder 74 is traversed in the manner described above, the lock pin 93 which is engaged with the positioning hole 39 of the magazine 34 engages with the magazine 34 and traverses the magazine 34 through the holder 57 to the position 34AI, so that the lefthand storage groove 38 is positioned at the jaw changing position B as shown in FIG. 13. Even when the traversing cylinder 74 is traversed in the manner described above, the supply of fluid under pressure will not be interrupted by the traverse of the traversing cylinder 74 because the fluid storage chambers 83 and 84 for supplying the fluid to the lock cylinder 73 and 73A are extended over a long length along the rotation preventive rods 82 and 82A. When the magazine 38 is traversed, the first jaw 12 loaded into the storage groove 38 previously is released from the engaging member 125 of the stopper shaft 128, but the dropping of the jaw 12 is prevented because when the magazine 38 is being traversed, the lower end of the loaded jaw 12 is supported by the rail 66.

When the lefthand storage groove 38 is positioned in the manner described above, as in the case of the first jaw 12, the next jaw 12 is pulled out of the chuck 6 and is located into the magazine 34. Finally, in order to load the third jaw 12 into the righthand engaging groove 38, the magazine 34 is traversed to the left. In this case, prior to the traverse of the magazine 34, the stopper cylinder 75 is actuated so that the spacer arm 100 located at the position indicated by the solid line in FIG. 2 is rotated to the position indicated by the imaginary line to be inserted between the stoppers 86 and 86A, thereby causing the spacer rod 96 which interrupts the traverse of the traversing cylinder 74 to retract. Thereafter, fluid under pressure is supplied to the lefthand cylinder chamber 86 to activate the traversing cylinder 74 so that the magazine 34 is traversed to the position 74AII to position the storage groove 38. When the magazine 34 is traversed to the left at the position 4AII indicated by the imaginary line in FIG. 13, the center jaw 12 which has been first loaded into the magazine 34 is supported by the rail 66 in the manner described above, but the left jaw 12 which has been secondly loaded into the magazine 34 is moved off the rail 66. However, in response to the above-mentioned traverse, the leftmost actuating shaft 42 is displaced to the push-down portion 60 and consequently is pushed down, and the engaging shaft 46 is advanced so that the engaging lug 48 engages with the jaw 12, thereby preventing the dropping thereof. Upon completion of the mounting of the third jaw 12, the magazine 34 is traversed by one pitch to the right to engage with the notch pin 62 and thus returned to its initial position. Thereafter, the lock cylinders 73 and 73A and the stopper cylinder 75 are actuated reversely so that the lock pins 93 are pulled out of the positioning hole 39 (See FIG. 6). Next, the spacer arm 100 is returned to its initial position so that the operation of pulling out the jaws 12 is accomplished. As described above, the traversed position and the upper and lower positions of the piston rods 88 and 88A of the lock cylinders 73 and 73A are detected by the dog 90 and the proximity switches 92, 92A, 92B and 92C. It must be pointed out here that the traverse sequence is not limited to that described above and that it may be suitably changed.

As described in detail above, after the three jaws 12 are pulled out and then loaded into the magazine 34, the indexing motor 68 of the indexing device 54 is energized to rotate the jaw changing arm 52 through 180° so that the magazine 34 loaded with jaws 12 to be used in the next machining operation and held by the holder 53 is indexed at the jaw changing position B. In this case, the control of the indexing angle is carried out by the above-described detecting member 70 and the proximity switch 71 (FIG. 1). In response to the rotation of the jaw changing arm 52, released is the idle pin 63 which has been located at the jaw changing position B and mated with the piston rod 118A of the first piston 118 and the draw shaft 142, and another idle pin; that is, the idle pin 63 on the side of the holder 53 holding the new magazine 34 loaded with new jaws 12 to be used mates with the piston rod 118A and the draw shaft 142. When the jaw changing arm 52 is rotated in the manner described above, the centrifugal force is exerted to the magazine 34, but the magazine 34 is engaged with the notch pin 62 so that it is lightly locked. As a result, the position at which the magazine 34 is loaded does not change from the correct position due to the centrifugal force and impact exerted thereto. The jaws to be newly used and the jaws pulled out of the chuck 6 both of which are loaded in the magazines 30 are rotated in contact with the guide rail 66.

When the jaw changing arm 52 is rotated in the manner described above so that the magazine 34 loaded with new jaws 12 to be used in the next machining operation is indexed to the jaw mounting position, the new jaws 12 are loaded into the jaw mounting grooves 10 of the chuck 6 in the following manner. First as described above, the lock cylinders 73 and 73A of the traversing device 72 are actuated to correctly position the center jaw in the storage groove of the indexed magazine 34. Thereafter, the jaw removing cylinder 112 are actuated so that the position of the jaw mounting groove 10 of the chuck 6 is determined and concurrently the engaging member 18 is retracted. Furthermore, the carrier rod 134 and the stopper shaft 128 are rotated in the manner described above so that the jaw 12 which has been engaged with the engaging member 125 of the stopper shaft 128 is brought into engagement with the engaging member 140 of the carrier rod 134.

When the engagement of the jaw 12 is changed between the stopper shaft 128 and the carrier rod 134 in the manner described above, the shift cylinder 130 is actuated, and the carrier rod 134 in engagement with the jaw 12 pushes the jaw 12 out of the storage groove 38. In the reversed sequence of pulling out the jaw 12, the jaw 12 is moved through the guide groove 113 of the guide block 111 to the jaw mounting groove 10 of the chuck 6 and then stopped. When the carrier rod 134 changes the jaw, the jaw removing cylinder 112 is actuated in the reverse direction so that the pressing of the operating pin 19 and the positioning of the chuck 6 are released. As a result, the engaging member 18 is advanced so that both the racks 16 and 20 are brought into mesh with each other and consequently the jaw 12 is loaded at a predetermined position in the jaw loading groove 10. Meanwhile, in response to the return to the initial position of the jaw removing cylinder 112, the carrier rod 134 is rotated in the opposite direction to disengage from the jaw 12. Thereafter, the shift cylinder 130 is moved back to its initial position. Thus, the mounting of the new first jaw 12; that is, the first jaw mounting operation is accomplished.

After the first jaw 12 is mounted in the chuck, the traversing device is energized so that the magazine 34 is sequentially traversed as in the case of the operation for pulling out the jaw, the engaging groove 38 is indexed at the jaw changing position C and the jaw 12 is loaded into the jaw mounting groove 10 in a manner substantially similar to that described above. Then, the traversing device 72 is returned to its initial position and the stopping cylinder 75 is also returned to its initial position so that the jaw changer 4 is retracted to its inoperative position shown in FIG. 1. As a result the magazine holder 53 holding the magazine 34 in which are loaded the used jaws 12 pulled out of the chuck 6 is brought to the mounting or dismounting position A at which the magazine 34 is pulled out of the holder 53 and the magazine 34 loaded with new jaws to be used in the next machining operation is mounted. The mounting of the magazine and the dismounting of the magazine can be accomplished automatically or manually. The empty magazine 34 which becomes empty due to the pull out of the jaws 12 remains mounted on the opposite holder 53 and waits for the next jaw changing operation. So far it has been described that after the A operation is accomplished the B operation and then the C operation are accomplished sequentially and independently of each other for the sake of better understanding of the present invention. In practice, however, the abovementioned operations may be carried out simultaneously as far as no hindrance occurs so that the cycle time can be shortened.

Next, some modifications of the preferred embodiment will be briefly described. So far it has been described that the number of the storage grooves 38 of the magazine 34 is equal to the number of the jaws to be changed or three, but this construction may be modified as follows. That is, the magazine 32 may have four storage grooves 38 which are in excess of three jaws 12 to be changed and one storage groove 38 remains empty while three jaws 12 to be changed are loaded in the remaining storage grooves 38, respectively. In operation, the jaw pulled out of the chuck 6 is loaded into the empty storage groove 38 and then the new jaw 12 is loaded into the engaging groove in the chuck 6. Such operation is repeated until all jaws are changed. Furthermore, the traverse sequence may be suitably changed. Moreover, the number of the jaw changing arms (that is, the number of the holder) is not limited to two and only one changing arm may be used even though a cycle time becomes longer. On the other hand, more than two changing arms 52 may be used even though a device for automatically changing jaws of a chuck in accordance of the present invention becomes large in size to some extent. In the latter case, depending upon the number of the jaw changing arms 52 to be used, the indexing angle must be changed accordingly. Finally, so far it has been described that the mounting position and dismounting position A are angularly spaced apart through 180° and are in opposing relationship with each other, but depending upon the arrangement of other auxiliary equipment or the like, the mounting and dismounting positions A may be determined suitably at other positions and the indexing device may be controlled accordingly.

As described in detail above, according to the present invention, in the case of changing jaws, they are loaded in parallel with each other in a magazine which is specially designed and constructed and then the magazine is inserted into the holder of the changing arm so that the jaws are changed when the magazine is sequentially traversed. As a result, the number of sets of jaws to be changed can be remarkably increased whereby various works can be machined by various ways. In addition, in spite of the capability of performing various operations, the device of the present invention can be made compact in size and light in weight as compared with the conventional jaw changers. Furthermore a traversing device for traversing a magazine is designed and constructed in the manner described above so that even though the jaw changer of the present invention is compact in size and has a minimum length of a pipe line for fluid under pressure, a magazine can be traversed to and located at various positions. Each set of jaws to be changed is loaded in each magazine and stored therein so that the maintenance of various jaws can be facilitated and the jaw changer of the present invention can satisfy all the demands required in the chuck jaw changing.

What is claimed is:

1. In a machine tool having a chuck with a number of jaw mounting grooves, a chuck jaw changer comprising:

an elongated chuck jaw magazine formed with a number of jaw storage grooves for respectively receiving chuck jaws therein, the jaw storage grooves being arranged side by side along the length of the magazine so as to open laterally and be spaced apart from each other by a predetermined distance;

a jaw changing arm swingably mounted on the machine tool, the jaw changing arm having an elongated magazine holder extending transversely to the arm, the magazine holder having a guide groove therealong for slidably receiving the magazine therein;

indexing means for swinging the jaw changing arm to locate the magazine, when in the magazine holder, at a magazine mounting and dismounting position or at a jaw changing position;

traversing means for sliding the magazine along the guide groove in the magazine holder while the magazine is at the jaw changing position to align any one of the jaw storage grooves of the magazine with any one of the jaw mounting grooves of the chuck on the machine tool; and jaw changing means for shifting a chuck jaw between the aligned one of the jaw storage grooves of the magazine and the jaw mounting groove of the chuck.

2. The chuck jaw changer according to claim 1, wherein said magazine comprises a guide portion to be slidably inserted into said guide groove of the magazine holder, and an engaging portion having the jaw storage grooves.

3. The chuck jaw changer according to claim 2, wherein the magazine further comprises an engaging mechanism for engaging chuck jaws respectively in the jaw storage grooves and preventing the chuck jaws from moving out of the jaw storage grooves.

4. The chuck jaw changer according to claim 3, wherein the engaging mechanism comprises, for each of the jaw storage grooves, an actuating shaft slidably passed through the guide portion for actuation by shifting lengthwise, and an engaging shaft also slidably passed through the guide portion for shifting in one direction in response to actuation of the actuating shaft, the engaging shaft having an engaging lug, the shifting of the engaging shaft in the one direction causing engagement of the engaging lug with the chuck jaw in a corresponding jaw storage groove.

5. The chuck jaw changer according to claim 3, wherein said guide groove of the magazine holder has an internal contour with a first portion for acting upon said engaging mechanism to actuate the same and with a second portion for acting upon said engaging mechanism to cancel the actuation of the same.

6. The chuck jaw changer according to claim 1, wherein said magazine holder has a substantially C-shaped cross section to define said guide groove therein.

7. The chuck jaw changer according to claim 1, wherein said magazine holder is mounted on an end of the jaw changing arm transversely to the length of the same.

8. The chuck jaw changer according to claim 1, wherein said traversing means includes a traversing member disposed to be shiftable along the length of the magazine holder and having pin means projecting from the traversing member for engagement with the magazine held in the magazine holder.

9. The chuck jaw changer according to claim 8, wherein said pin means is shiftable toward and away from the magazine held in the magazine holder.

10. The chuck jaw changer according to claim 8, wherein said traversing means has stopper means for stopping the shift of the traversing member.

11. The chuck jaw changer according to claim 1, wherein said jaw changing means has a carrier rod formed with a hook-shaped engaging member and disposed to make a shifting movement along the length thereof to move the engaging member between the chuck and the magazine held in the magazine holder, said carrier rod being rotatable to cause the engaging member to engage with and disengage from the jaw.

12. The chuck jaw changer according to claim 1, wherein said jaw changing arm, indexing means, traversing means and jaw changing means are mounted on a table movable on the machine tool between an advanced operative position and a retracted inoperative position.

13. The chuck jaw changer according to claim 1, in combination with the chuck on the machine tool, the chuck having a number of jaw mounting grooves, the number of the jaw storage grooves of the magazine being equal to the number of the jaw mounting grooves of the chuck or exceeding the same by one.

* * * * *